Aug. 15, 1939     F. REINHOLZ     2,169,430

DEVICE FOR PRODUCING VEGETABLE INFUSION

Filed Jan. 12, 1939     2 Sheets-Sheet 1

Inventor
FRANZ REINHOLZ
by David Rines
atty.

Aug. 15, 1939     F. REINHOLZ     2,169,430
DEVICE FOR PRODUCING VEGETABLE INFUSION
Filed Jan. 12, 1939     2 Sheets—Sheet 2
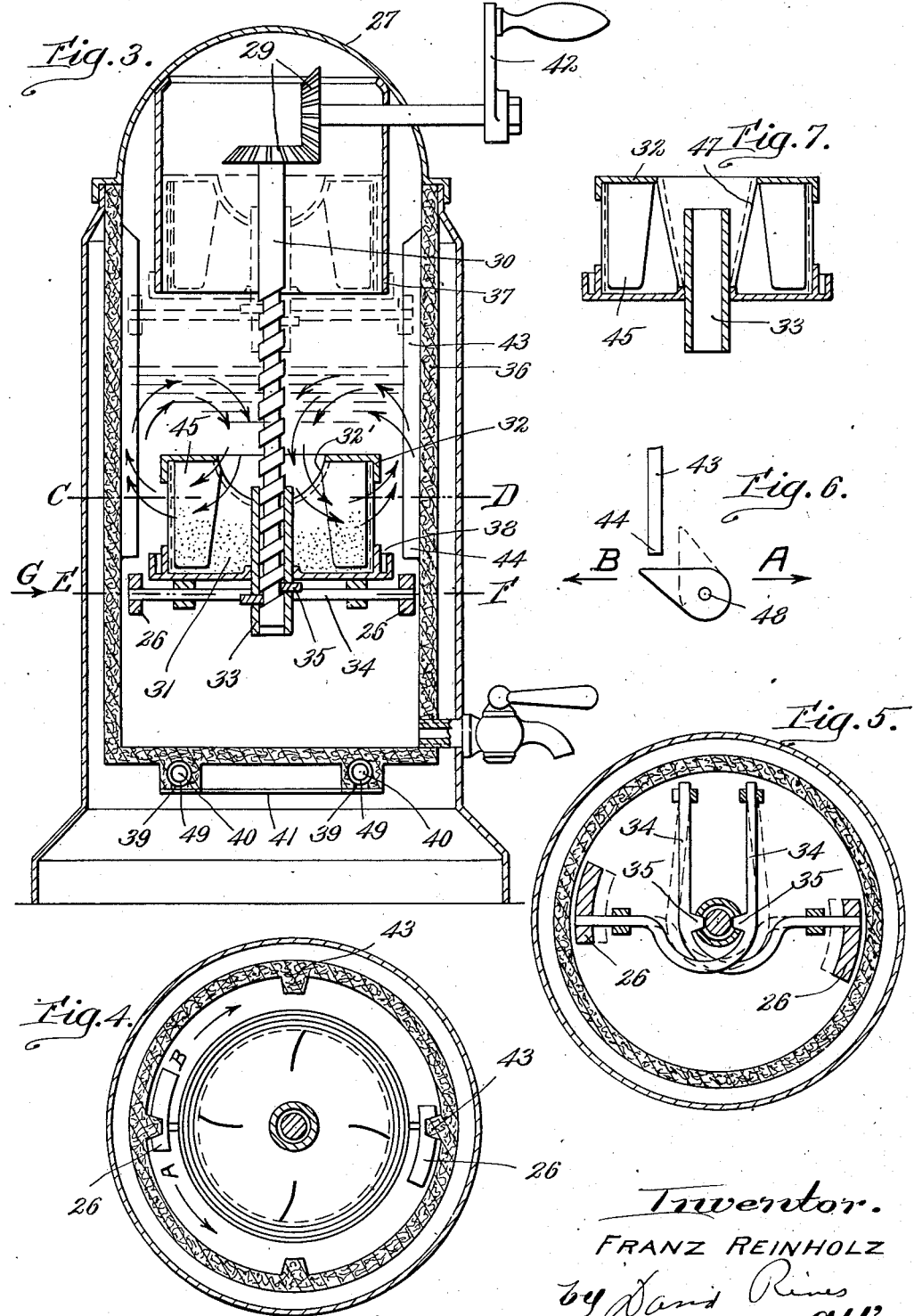
Inventor.
FRANZ REINHOLZ
by David Rines
att'y.

Patented Aug. 15, 1939

2,169,430

UNITED STATES PATENT OFFICE 2,169,430

DEVICE FOR PRODUCING VEGETABLE INFUSION

Franz Reinholz, Frankfort-on-the-Main, Germany

Application January 12, 1939, Serial No. 250,541
In Germany April 9, 1937

12 Claims. (Cl. 53—3)

The present invention relates to a device for producing vegetable infusions by lixiviating vegetable substances by means of hot or boiling liquids and is especially suitable for producing beverages such as coffee.

The device according to the invention comprises a receptacle for the vegetable substance to be lixiviated which receptacle is provided with an unbroken lower surface and at least on the side walls, with perforations, the said receptacle being adapted to be lowered into and rotated within the lixiviating liquid, being mounted in the chamber for the lixiviating liquid upon a guide spindle provided with driving means, and when not in use, i. e., when raised above the level of the lixiviating liquid, filling a recess in a partition wall arranged above the chamber for the said liquid.

By means of this device it is possible to protect the vegetable substance to be lixivated from the vapours arising from the lixiviating liquid until the said liquid reaches the desired temperature, so as to produce initially an uninterrupted, dry opening-up of the vegetable substance by means of the heat and in this manner to avoid loss of the aromatic ingredients of the vegetable substance, and moreover, when the thus dried and opened up vegetable substance is centrifuged in the liquid which is warmed or heated to the desired temperature, to obtain an accelerated and thorough working up of the substance treated.

In order to produce beverages, such as coffee and tea, or other vegetable infusions, for example medicines, it was formerly customary to effect an extraction by pouring hot or boiling liquid over the substances concerned in open vessels, if desired after a preliminary comminution, for example grinding, or in extraction containers, preferably under pressure, or by lixiviating the said substances by percolation.

When pouring boiling liquids over vegetable substances for example ground coffee, in open vessels, the aromatic substances are for the greater part volatilized in the escaping steam. The lixiviating liquid cools comparatively quickly so that it is necessary to allow the liquid to act upon the vegetable substance for some time, and this often results in undesired ingredients of the vegetable substances, such as pigments, tannins, resins and the like, being also lixiviated.

Moreover, extraction of percolation does not in all cases lead to satisfactory results, as in these processes undesired ingredients are also extracted owing to the long period of action and because owing to the absence of a previous dry opening-up of the various aromatic ingredients, these latter ingredients cannot come under the action of the lixivial liquid.

It has already been proposed to use containers for receiving the ground coffee in coffee machines, said containers being located in the interior of the water heater and adapted to be immersed in the liquid by means of convenient mechanism and a suitable driving medium, after the said liquid reaches boiling point, and moved up and down in the said liquid in such a manner as to allow the boiling liquid to percolate through the ground coffee placed within the strainer-like walls.

The insulation of the ground coffee from the vapours arising from the slowly heated liquid in the lower part of the container is however still imperfect, and consequently no dry opening-up of the ground coffee takes place before it is immersed in the boiling liquid. Moreover, the liquid does not flow through all the parts of the piston-like container of this known device during the up and down movement of the container, and consequently pockets of dry substance are formed and an insufficient working up of the ground coffee results.

By means of the device according to the invention these drawbacks are eliminated, for, as already mentioned the substance to be scalded, for example ground coffee, is kept entirely enclosed and protected against the liquid or its vapours during the warming or heating of the said liquid, as the receptacle for the substance to be infused is kept in an enclosed space in the walls of which a recess is provided as a seating for the unbroken underside of the said receptacle, which is thus heated by the vapours passing over it. This ensures a preheating of the substance to be infused and a preparatory dry opening-up of the cells which facilitates the subsequent lixiviation.

The receptacle is guided upon a spindle and immersed in the lixiviating liquid and rotated therein when the said liquid reaches the desired temperature, by means of gearing adapted to be hand-operated, for example by means of a crank.

A few constructional forms of the device according to the invention are illustrated in the annexed drawings, and the construction and method of working of the device will now be explained in detail with reference to these drawings and a few further possible constructions will also be indicated.

Figure 3 illustrates a further form of construction of the device, also in longitudinal section.

Figure 4 is a cross section through the container according to Figure 3, on the line C—D.

Figure 5 is a section through the same container on the line E—F.

Figure 6 is a detail view of the button A illustrated in Figure 3 seen in the direction of the arrow G.

Figure 7 is a detail view of a further form of construction of the receptacle for the vegetable substance.

Figure 1:
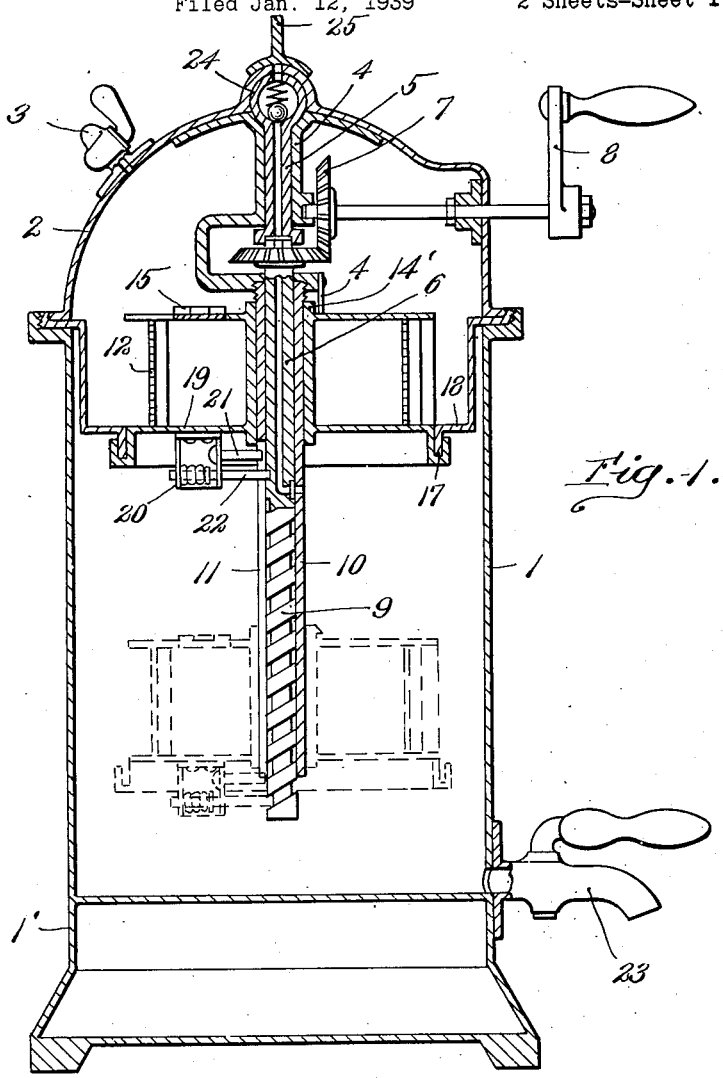
Figure 1 illustrates a longitudinal section through a device intended, for example, for domestic use.
Figure 2:
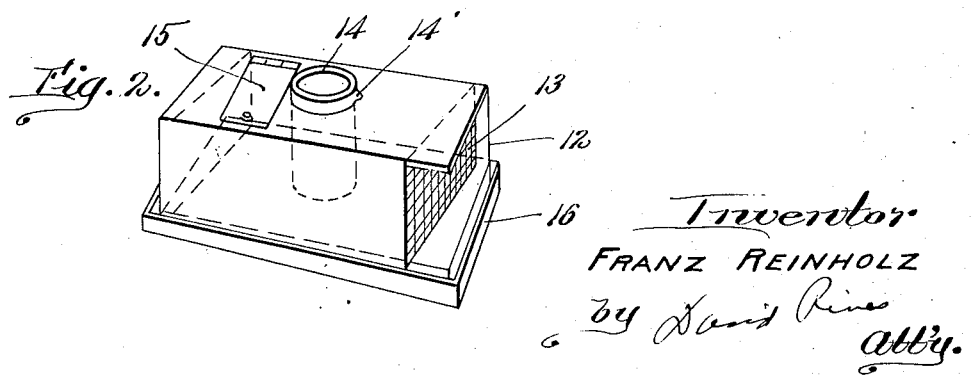
Figure 2 illustrates a constructional form of the receptacle for the vegetable substance.

Referring to Figure 1, 1 is the housing which receives the lixiviating liquid in the lower part thereof, into which the receptacle containing the substance to be scalded is lowered and rotated therein by the driving mechanism provided for that purpose.

Said container housing is closed at the top by means of a cap 2 having a relief valve 3.

The cap 2 carries in a cylindrical extension 4 the tube 5 and, on an angular bracket formed on said extension the tube 6.

By means of the right-angle drive 7 having a hand crank 8 a rotary motion is imparted to the tube 6, the lower portion of which is provided with an external worm thread 9. The tube 6 in turn moves within a sleeve 10, which is firmly screwed into the bracket on which the right-angle drive is mounted. The sleeve 10 is provided with a slot 11 extending in the axial direction thereof.

The receptacle 12 is mounted from above over the tube 10. Said receptacle possesses a horizontal cross section in the form of a parallelogram. The sidewalls 13 are displaced inwardly and constituted by wire gauze, whilst all the remaining walls of the receptacle are solid. An opening is provided in the top wall and closed by means of a cover 15. A sleeve 14 inserted approximately centrally through the receptacle ensures perfect guiding of the receptacle along the tube 10. The bottom 19 of the receptacle is provided with an approximately U-shaped beading 16 which engages from below with the flange 17 provided on the partition wall 18 so as to constitute a tight joint separating the compartments above and below the partition wall from one another, the latter of which acts as a heating chamber for the lixiviating liquid.

On the underside of the bottom wall 19 there is also attached the web of a channel shaped carrier 20 to one flange of which a pin 21 is riveted from the inside, a further, springloaded displaceable pin 22 passing through both flanges of the channel section.

The pin 21 engages with the longitudinal slot in the tube 10, whilst the slightly longer pin 22 engages with the worm thread of the tube 9 through the slot in the tube 10.

A drain cock 23 is provided in the bottom of the container housing proper. 24 is a ball valve provided in the cap 2 and having a displaceable cap 25.

The passage which is obturated by the ball of said valve communicates with the lower compartment of the container through the tubes 5 and 6, so that also when the upper chamber is closed against the lower chamber, pressure in the latter can still be relieved.

The device operates in the following manner:

After removing the upper portion of the container and with it the receptacle 12, the lower compartment of the container 1 is filled with a sufficient quantity of liquid, for example water, whereupon the receptacle 12 which has meantime been filled, for example with ground coffee, through the opening closed by the filler cap 15, is mounted on the tube 10, the pin 21 engaging with the slot 11 and the pin 22 with the worm thread 9; the receptacle 12 is then lifted against the partition wall 18 until the groove 16 meshes with the vertical flange 17.

The liquid in the lower compartment 1' of the container 1 is then heated, for example by means of a resistance heater, and the hot steam is allowed to impinge upon the underside of the receptacle 12 until the liquid reaches boiling point.

Owing to the heating of the bottom wall 19 the contents of the receptacle 12 undergo a dry opening-up process, the vapours from the said content collecting in the upper compartment. As soon as the liquid has reached the desired temperature, for example boiling point, the crank 8 is rotated clockwise so that the receptacle 12 is at first lowered by means of the pin 22, without rotary movement owing to the pin 21 engaging in the slot and preventing the receptacle from carrying out a rotary movement.

During the initial downward movement of the receptacle the cam 14' is disengaged from the spring 4' which latter tends to maintain the receptacle in its tightly closed position in relation to the partition wall.

The receptacle 12 is lowered until the pin 21 disengages from the slot in the tube 10, said tube not extending downwardly over the entire length of the worm thread 9.

Consequently further clockwise rotation of the crank 8 causes the receptacle 12 to be rotated by means of the pin 22, and the hot liquid to percolate through the receptacle through the strainer-like walls 13.

On completion of the lixiviation the receptacle 12 is raised by anticlockwise rotation of the crank 8 until it again closes the lower compartment tightly against the upper compartment.

In the annexed drawings Figure 1, the dotted lines indicate the receptacle in position for carrying out the rotary movement.

Instead of providing the receptacle for the substance to be lixiviated, for example ground coffee, with displaced side walls hereinbefore described a receptacle having circular, square or rectangular cross section may also be utilized, the side walls of which may be either partly or entirely provided with perforations, for example they may be made of wire gauze, provided vanes are arranged inside the receptacle for the purpose of distributing and directing the percolating liquid.

It has also been found particularly satisfactory to provide the top surface of the receptacle with perforations, said top surface being then preferably also made concave. It has been found that a still higher yield can be obtained from the substance to be infused and that the lixiviation is accelerated.

Owing to the rotary movement of the receptacle the liquid is drawn from above through the perforated top wall with comparatively great force under the influence of the centrifugal force and this is particularly so when the action of the centrifugal force is supplemented by the action of vanes within the receptacle, placed at an angle and preferably attached to the top cover, the liquid passing through the substance to be lixiviated and being forced out through the perforations in the side walls.

This effect can be further enhanced by preventing eddies from forming in the water outside the receptacle by means of ribs or vanes provided in the container for the liquid.

A device having these constructional features is illustrated in detail in Figure 3.

When commencing operation the domed cap 27 is first removed, so that both the right-angle drive 29, the worm spindle 30 attached thereto and the receptacle 31 can be easily withdrawn.

The receptacle 31 has a circular cross section, its side walls forming a sieve, made for example, of wire gauze.

The top of the receptacle is closed by a cover 32, to which are attached radially arranged vanes 45 and an inner concave hemispherical part 21', the latter also being formed of wire gauze or the like, and connected to the tubular member 33, which passes through the receptacle and the bottom wall thereof.

For the purpose of filling the receptacle 31 it must be dismantled in downward direction from the worm spindle 30. To this end the buttons 26 are pressed inwardly against one another so that the pincer-like springs 34 to the free ends of which the buttons are attached are forced apart at a point beyond their crossing point as illustrated in Figure 5, and the projections 35 attached to the inside of the two springs are lifted out of the worm thread of the spindle 30.

The cover 32 of the receptacle is then removed, the receptacle filled, the lower compartment of the container 36 filled with water, the receptacle 31 replaced on the spindle and raised until the channel-shaped groove 38 on the bottom plate of the receptacle engages from below with the flange 37 on the under side of the domed cap 27.

In this case it is not necessary that the rim of the flange 37 shall form a tight joint with the channel-shaped annular collar 38, because when steam is generated above the level of the liquid in the lower compartment of the container, said steam soon commences to condense upon the outer wall of the flange 37, the condensate collecting in the groove 38 thus producing a tight joint against the lower compartment. As soon as the water or other lixiviating liquid in the container 36 reaches the desired temperature, the hand crank 42 is rotated and by means of the gear wheels of the right-angle drive 29 a rotary motion is imparted to the spindle 30. In this manner the receptacle 31 is lowered without being rotated, as the buttons 26 attached to the springs 34 bear upon the vanes 43 attached to the inside wall of the container 36 whilst the projections 35 of the springs 33 act as nuts in the worm thread of the spindle 30. As soon as the receptacle reaches the lower end of the spindle the buttons 26 are disengaged from the ends 44 of the vanes 43, so that a further rotation of the spindle imparts a rotary motion to the receptacle 31.

By means of suction action under the influence of the centrifugal force the liquid is drawn from above through the perforated cover into the receptacle and centrifuged out through the perforated side walls thereof.

On completion of the lixiviating process the receptacle is raised, the water pressure pivoting the buttons, which are rotatably arranged upon the axis 48, through 90° as illustrated in Figure 6, so that the points of the buttons bear against the ends 44 of the vanes and prevent a further rotary movement on the part of the receptacle, the latter being raised by means of the projections 35 engaged with the worm spindle 30.

In order to make it possible for the water which during the rotation of the receptacle passes through the cover thereof, to flow through the receptacle from top to bottom it has also been found advantageous to design the perforated portion of the cover in the form of an approximately conical tubular member 47 reaching to the bottom of the receptacle, as illustrated in Figure 7.

This tubular member also ensures that the vegetable substance adjacent the bottom of the receptacle is reached by the liquid current and thus ensures a satisfactory percolation.

It also prevents the charge in the receptacle from being pushed away from the central guide tube 33 when the cover 32 is placed on the receptacle, so that no compression of the contents takes place which would have a deleterious influence upon the lixiviation.

According to the constructional form illustrated in Figure 3 an electrical resistance heater is provided for heating the lixiviating liquid, said heater being in the form of a wire spiral 49 let into the bottom of the container 36 and inserted through the aperture 39 in the groove 40 with preliminary tension, so that even if the insulation 39 is defective, the spiral cannot drop out.

The device as a whole is easy to clean, the lixivial container and all interior parts are easily accessible, as the domed cap together with the driving mechanism and the receptacle can be easily withdrawn as one unit. The arrangement is suitable for use by small traders as well as by larger establishments.

What I claim and desire to secure by Letters Patent of the United States is:

1. A device for producing vegetable extracts by lixiviation by means of heated liquids, comprising a chamber for the lixiviating liquid, a receptacle for the vegetable substance to be infused, provided with an unbroken bottom surface and at least two perforated side walls, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

2. A device for producing vegetable extracts by lixiviation by means of heated liquids, comprising a chamber for the lixiviating liquid, a receptacle for the vegetable substance to be infused, provided with an unbroken bottom surface and at least two strainer-like side walls, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

3. A device for producing vegetable extracts by lixiviation by means of heated liquids, comprising a chamber for the lixiviating liquid, a receptacle for the vegetable substance to be infused, provided with an unbroken bottom surface and at least two perforated side walls displaced inwardly, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

4. A device for producing vegetable extracts by lixiviation by means of heated liquids, comprising a chamber for the lixiviating liquid, a receptacle for the vegetable substance to be infused, said receptacle having a cross section parallel to its base in the form of a parallelogram and being provided with an unbroken bottom surface and at least two perforated side walls, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

5. A device for producing vegetable extracts by lixiviation by means of heated liquids, comprising a chamber for the lixiviating liquid, a receptacle for the vegetable substance to be infused, provided with a perforated cover and with an unbroken bottom surface and at least two perforated side walls, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

6. A device according to claim 5, in which the perforated cover for the receptacle is indented inwardly.

7. A device according to claim 5, in which the perforated cover for the receptacle is indented inwardly in the form of a straining funnel extending to the bottom of the receptacle.

8. A device for producing vegetable extracts by lixiviation by means of heated liquids, comprising a chamber for the lixiviating liquid, a receptacle for the vegetable substances to be infused provided with an unbroken bottom surface and at least two perforated side walls, said bottom surface when in position above the lixiviating liquid filling an opening in a partition wall located in the upper part of the chamber for the lixiviating liquid, said receptacle being mounted by way of a guide tube passing through the centre of said receptacle upon a spindle provided with a worm thread and rotatable by means of a crank drive, and means for lowering the receptacle into the liquid to a predetermined depth and subsequently rotating it therein comprising guide projections engaging resiliently with the worm of the spindle and a rectilinear guide of a shorter length than the spindle.

9. A device for producing vegetable extracts by lixiviation by means of heated liquids, comprising a chamber for the lixiviating liquid, a receptacle for the vegetable substance to be infused, provided with an unbroken bottom surface and at least two perforated side walls, said bottom surface when in position above the lixiviating liquid filling an opening in a partition wall located in the upper part of the chamber for the lixiviating liquid and means for lowering the receptacle into the liquid to a predetermined depth and subsequently rotating it therein, comprising sleds attached to the receptacle by means of springs provided with guide projections engaging resiliently with the worm of the spindle, said sleds sliding over vanes provided on the inside surface of the liquid container and of a shorter length than the spindle.

10. A device for producing vegetable extracts by lixiviation by means of heated liquids, comprising a chamber for the lixiviating liquid, a receptacle for the vegetable substance to be infused, provided with an unbroken bottom surface and at least two perforated side walls, an outwardly open channel section on the bottom of said receptacle, a partition wall located in the upper part of the chamber for the lixiviating liquid, said partition wall having an opening therein of the same size as the bottom of the receptacle and having a downwardly directed flange for engagement with the said channel section to provide a tight joint when the said bottom surface is caused to take up a position above the lixiviating liquid, and driving means for lowering the said receptacle into the lixiviating liquid along a guide spindle extending into the said liquid.

11. A device for producing vegetable extracts by lixiviation by means of heated liquids, comprising a chamber for the lixiviating liquid, a receptacle for the vegetable substance to be infused, provided with an unbroken bottom surface and at least two perforated side walls and radial vanes arranged in the manner of the vanes of a leading wheel, said bottom surface when in position above the lixiviating liquid filling an opening in a partition wall located in the upper part of the chamber for the lixiviating liquid, and driving means for lowering the said receptacle into the lixiviating liquid along a guide spindle extending into the said liquid.

12. A device for producing vegetable extracts by lixiviation by means of heated liquids, comprising a chamber for the lixiviating liquid, a receptacle for the vegetable substance to be infused, provided with an unbroken bottom surface, at least two perforated side walls and radial vanes arranged in the manner of the blades of a leading wheel and attached to the inside cover of the receptacle, said bottom surface, when in position above the lixiviating liquid filling an opening in a partition wall located in the upper part of the chamber for the lixiviating liquid, and driving means for lowering the said receptacle into the lixiviating liquid along a guide spindle extending into the said liquid.

FRANZ REINHOLZ.